United States Patent [19]

Ferrante

[11] Patent Number: 4,794,237
[45] Date of Patent: Dec. 27, 1988

[54] MULTIDIRECTIONAL HOLOGRAPHIC SCANNER

[75] Inventor: Ronald A. Ferrante, Senecaville, Ohio

[73] Assignee: NCR Corporation, Dayton, Ohio

[21] Appl. No.: 929,050

[22] Filed: Nov. 10, 1986

[51] Int. Cl.⁴ .............................................. G06K 7/10
[52] U.S. Cl. .................................... 235/457; 235/454; 235/462; 235/467
[58] Field of Search ............... 235/457, 454, 462, 463, 235/467

[56] References Cited

U.S. PATENT DOCUMENTS

| | | | |
|---|---|---|---|
| 3,544,800 | 12/1970 | Elliott | 250/231 |
| 3,728,677 | 4/1973 | Munson | 340/146.3 F |
| 3,796,498 | 3/1974 | Post | 356/169 |
| 3,947,816 | 3/1976 | Rabedeau | 340/146.3 Z |
| 3,978,318 | 8/1976 | Romeo et al. | 235/61.11 E |
| 3,995,166 | 11/1976 | Hobart et al. | 250/566 |
| 4,057,784 | 11/1977 | Tafoya | 340/146.3 F |
| 4,167,666 | 9/1979 | Miller et al. | 250/216 |
| 4,224,509 | 9/1980 | Cheng | 235/457 |
| 4,333,006 | 6/1982 | Gorin | 235/457 |
| 4,369,361 | 1/1983 | Swartz et al. | 235/470 |
| 4,418,276 | 11/1983 | Yatsunami | 235/462 |
| 4,591,236 | 5/1986 | Broockman | 235/457 |

Primary Examiner—A. D. Pellinen
Assistant Examiner—Leon K. Fuller
Attorney, Agent, or Firm—Wilbert Hawk, Jr.; Albert L. Sessler, Jr.; Richard W. Lavin

[57] ABSTRACT

A holographic scanning system for scanning a bar coded label is disclosed in which the light beams of a laser are directed at a set of holograms located on a rotating disk in which each hologram will generate an individual scan beam having a slightly different focal length and direction angle from that of the other holograms. Each of the scanning beams is directed at a plurality of mirrors which reflect the beams in the form of a scanning pattern on a scanning area through which a coded label on an article will pass. Each of the scanning beams is projected in an overlapping relationship on the scanning area, thereby providing an enhanced depth of focus enabling a more effective reading operation. The light reflected from the bar coded label is collected by the holograms for collimating the reflected light beams. The collimated light beams are directed at a lens member which focuses the received light beams on a photodetector for use in reading the bar coded label.

10 Claims, 5 Drawing Sheets

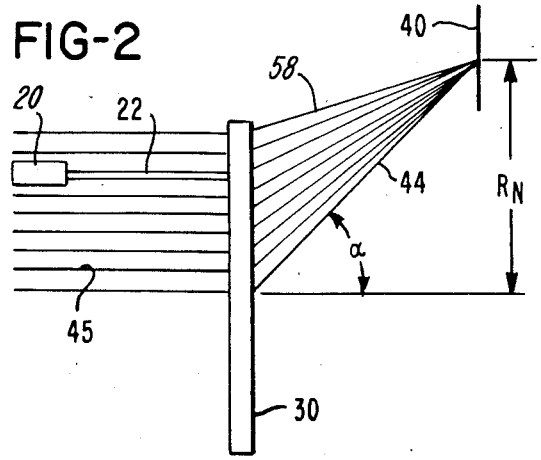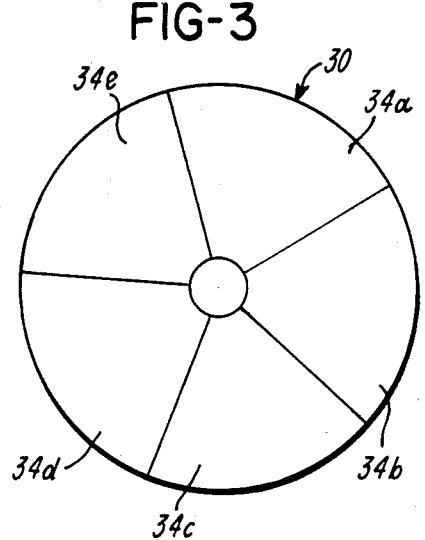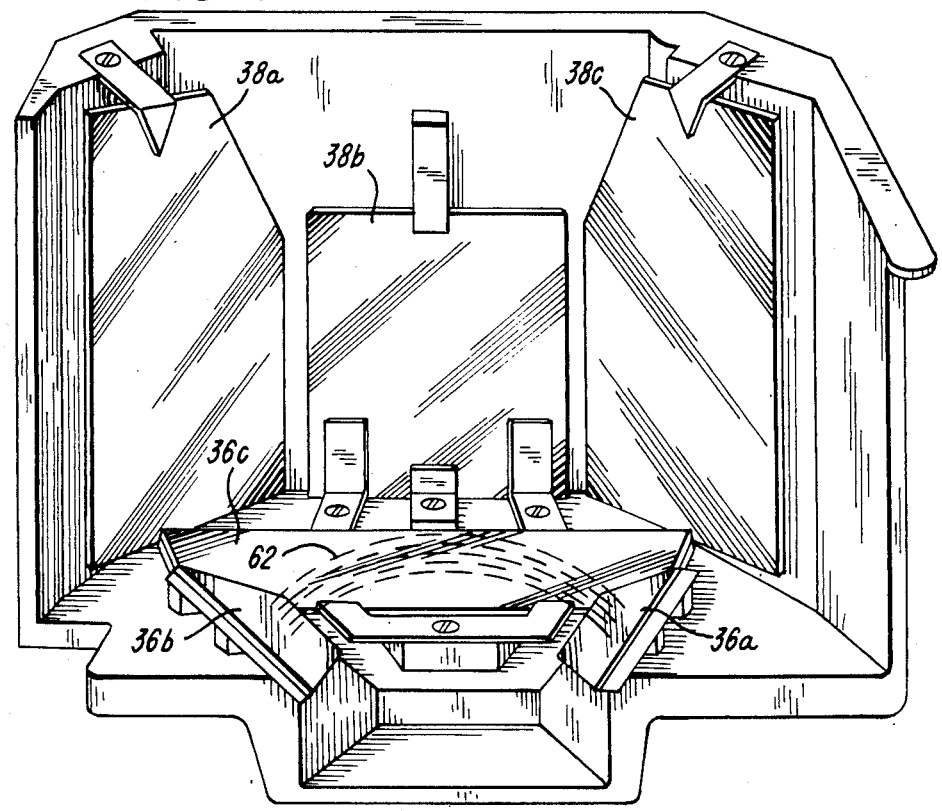

MULTIDIRECTIONAL HOLOGRAPHIC SCANNER

BACKGROUND OF THE INVENTION

In present-day merchandising point-of-sale operations, data pertaining to the purchase of a merchandise item is obtained by reading data encoded indicia such as a bar code printed on the merchandised item. In order to standardize the bar codes used in various point-of-sale read out systems, the grocery industry has adopted a uniform product code (UPC) which is in the form of a bar code. Various reading systems have been constructed to read this bar code, including hand-held wands which are moved across the bar code and stationary optical reader systems normally located within a checkout counter and in which the bar code is read when a purchased merchandise item is moved across a window constituting the scanning area of the counter, which movement is a part of the process of loading the item in a baggage cart.

Prior scanning systems have utilized holograms for generating a scanning pattern on a target area through which the object bearing bar code indicia passes. The light reflected from the bar code indicia is used in reading the bar code. One example of this type of scanning system may be found in the commonly owned U.S. Pat. No. 4,224,509, in which a plurality of holograms are mounted on a rotating disk, each of the holograms, producing a single scan line on the target area during one revolution of the disk. In order to increase the number of scan lines, the number of holograms mounted on a disk must be increased, which increases the diameter of the disk and the cost of the system. In commonly owned U.S. Pat. No. 4,333,006, a plurality of holograms are mounted on the rim portion of a rotating disk member in which each of the holograms will generate an individual scan beam having a different focal length and diffraction angle from that of the other holograms on the disk. A second set of holograms mounted on the rotating disk focuses the reflected scan beam at a point at which is located an optical detector. Again, the number of holograms mounted on the disk must be increased to increase the density of the scan pattern which increases the cost of the scanner system. While the above-cited scanning system works well in scanning UPC labels mounted on a flat surface, where the UPC label is truncated so as to be located on a small merchandise item such as a package of gum or is located on a curve surface, the reading efficiency of the above cited scanning systems become unacceptable.

It is therefore a principal object of this invention to provide an improved scanning system for projecting a high density multiple-line pattern which provides an enhanced depth of focus at the target area allowing the reading of a label to take place irrespective of the orientation and size of the label.

It is a further object of this invention to provide a scanning system which is high in reader efficiency while low in cost.

SUMMARY OF THE INVENTION

In order to fulfill these objects, a scanning system is provided which comprises optical means for directing the multiple beams of a laser through a plurality of holograms which form a rotating disk, each hologram having a different focal length and diffraction angle which projects the laser beam towards a pattern of mirrors which in turn directs the received laser beams toward a target area forming a high number of scan lines during each revolution of the disk. Light reflected by a bar code label positioned in the target area is reflected back via the mirrors and the same holograms, from where the reflected light beams are directed to an optical detector which converts the light beams into electrical signals.

BRIEF DESCRIPTION OF THE DRAWINGS

Additional advantages and features of the present invention will become apparent and fully understood from the following detailed description when read in conjunction with the drawings wherein like numerals identify corresponding elements.

FIG. 2 is a schematic representation of the holographic scanning system of the present invention for reading the UPC bar code.

FIG. 3 is a front view of the rotating disk showing the shape of the holograms which scan and collect the reflected scanning beams;

FIG. 4 is a front view of a mirror system used to generate a scanning pattern;

DESCRIPTION OF THE PREFERRED EMBODIMENT

Figure 1:
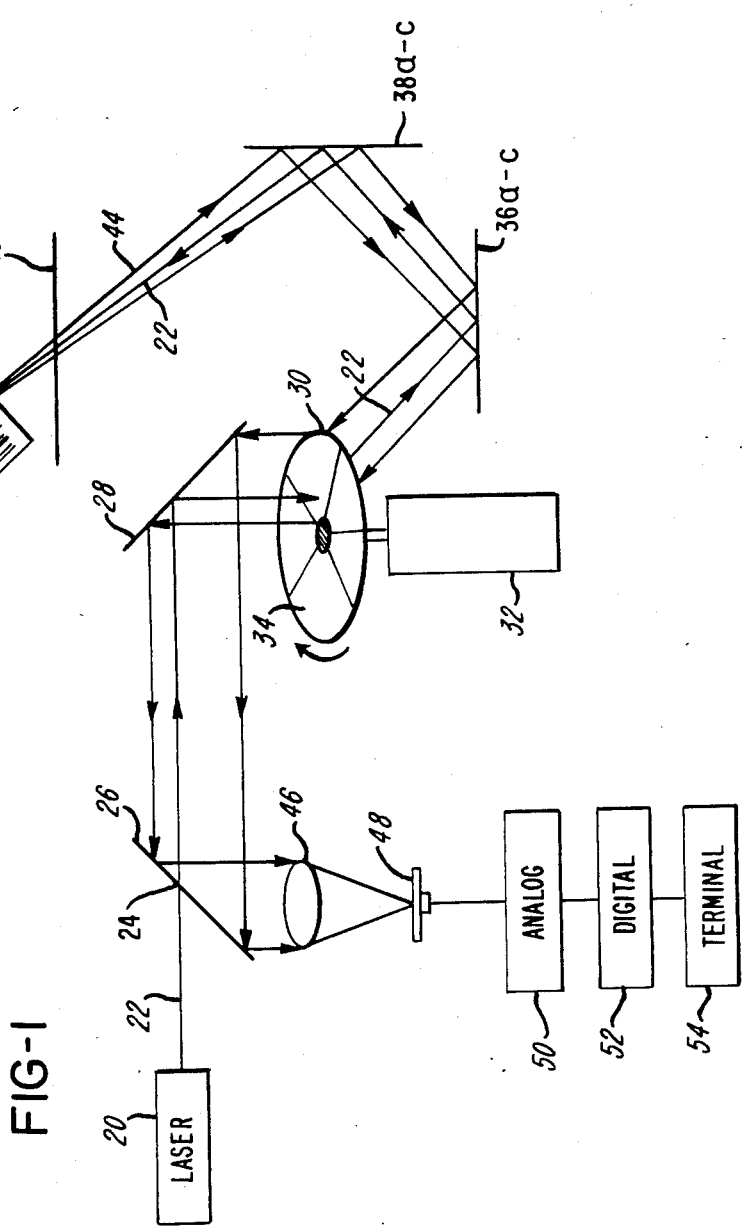
FIG. 1 is a schematic representation of the holographic scanning system of the present invention showing projection lines of the scanning beams generated by the holograms located in the rotating disk.
Figure 10:
FIG. 10 illustrates a normal UPC label which is scanned by the scanning apparatus of the present invention.

Referring now to FIG. 1, there is shown a schematic representation of a UPC holographic scanning system employing the present invention which includes a one milliwatt helium-neon laser 20 which directs a light beam 22 through an aperture 24 located in the mirror 26 onto the surface of a mirror 28 which reflects the light beam onto a rotating holographic disk member 30. The disk member 30 is rotated by a motor 32. The holographic disk member 30 is composed of five holograms 34a–34e inclusive (FIG. 3), each of which will project the light beam 22 by diffraction towards a plurality of pattern folding mirrors 36a–36c inclusive (FIG. 4) from where the light beam is reflected towards a plurality of second pattern folding mirrors 38a–38c inclusive (FIG. 4) which in turn reflects the light beam to a target area represented by the plane 40 through which a UPC bar code label 42 (FIG. 10) passes. As is well-known in the art, the UPC bar code comprises a plurality of light and dark bars which, when scanned by the scanning apparatus, will generate a specific pulse train wave-form. The reflected light beams 44, generated upon the scanning of the bar code label 42 by the light beams 22, are scattered from the bar code surface with part of the scattered light beams directed back towards the pattern folding mirrors 36a–36c inclusive and 38a–38c inclusive, from where the reflected light beams 44 are directed back towards the disk member 30. As will be described more fully hereinafter, the reflected light beams 44 are collimated by diffraction by the holograms 34 located in the disk member 30. The collimated light beams 45 (FIG. 2) are then directed at the mirror 28 which deflects the collimated light beams towards the mirror 26 from where the light beams are deflected towards a collection lens 46 which may comprise an air space doublet lens system. The lens 46 will direct the reflected light beams toward an optical detector 48 which converts the optical signals into electrical signals and then transfers the electrical signals to an analog electronic system 50 which amplifies the analog signals. The system 50 then transmits the amplified analog signals to a digital processor 52 which digitizes the signal. The processor 52 will determine if a valid read operation has occurred and will notify a utilizing device such as a terminal device 54 of the valid read operation. The decoded signal is then read by the terminal device 54.

Referring now to FIGS. 2 and 3, there are shown details of the construction of the rotating disk 30 (FIG. 1). As best seen in FIG. 3, the disk 30 comprises a glass plate on which are formed a plurality of holograms 34a–34e inclusive which diffract the light beam 22 outputted by the laser 20 forming a scan line and collect the diffusely reflected light beams from the UPC bar code label 42. As is well-known in the art, a hologram is a recording of all the information in a wave front of light obtained from an object which is illuminated with spatially-coherent monochromatic light, rather than an image of the object obtained in ordinary photography. The term "monochromatic" light, as used herein, means light composed substantially of a single wave length, while "spatially-coherent" light, as used herein, means light emanating actually or apparently from a point source. The hologram consists of the recording of the interference fringes in the wave front covering a given area in a plane resulting from the interference between a first component of light obtained directly from a spatially-coherent monochromatic originating light source, which first component is directed to the given area in the plane at a predetermined angle with respect thereto, and a second component of light obtained from the object to be recorded which is illuminated by a light originating from the same light source simultaneously with the first component, the second component being directed at least in part to the given area in a plane of an angle alpha (FIG. 2) other than the aforesaid predetermined angle.

These interference fringes result from the fact that the difference in path length enhances the difference in phase, between the first or reference component of spatially-coherent monochromatic light and the second or information component of spatially-coherent monochromatic light which varies from point to point. Therefore, constructive interference between the two components takes place at certain points, and destructive interference between the two components takes place at other points. Furthermore, the relative amplitude of the second or information component of such light varies from point to point. This causes a variation in the contrast of the resulting interference fringes. In this manner, the recorded interference fringes form a pattern which defines both the amplitude and the phase of the second or information component as modulations in the contrast and spacing of the recorded interference fringes. This recorded pattern, which is called a hologram, contains all the information that can be carried by light waves transmitted through, reflected or scattered from a object.

A replica of the wave front which comprises the second or information component may be constructed by illuminating a hologram with a source of spatially-coherent monochromatic light. In this case the hologram diffracts the light impinging thereon to form two sets of first order diffracted waves, each of which is a replica of the wave that issued from the original object. One of these two sets, the one projected back to the illuminating source, produces a virtual image of the original object, while the other of these two sets produces a real image of the object through the use of a lens. The virtual image is in all respects like the original object and, if the original object was three dimensional, the reconstructed virtual image shows depth and gives rise to parallax effects between near and far objects in the same manner as did the original object. The real image, however, is pseudo-scopic, that is, its curvature is reversed with respect to the original object, convex regions appearing to be concave, and vise versa.

As illustrated in FIGS. 2 and 3, upon the laser 20 (FIGS. 1 and 2) propagating a light beam 22 to one of the holograms 34a–34e inclusive mounted on the disk 30, the light beam 22 will be diffracted by the hologram in a 120 degree arc at an angle of diffraction which varies slightly with each hologram. In the present description, the hologram 34a (FIG. 3) will have a diffraction angle of 48 degrees. Each of the other holograms 34b–34e inclusive, starting with 34b, has an diffraction angle with respect to the hologram 34a of 1 degree greater than the previous hologram. The scanning arc alpha will have a radius of $R_N$ (FIG. 2) which varies with each of the holograms 34a–34b inclusive. A wide range of $R_N$ values for the holograms would result in a proportionally wide range of scan beams and therefore a wide range of tangential spot velocities of the diffracted beams which in turn would require a wide electronic band width for the photodetector 48 (FIG. 1). Hence, the photodetector 48 would need a greater sensitivity to ambient electronic noise. By selecting a narrow range of $R_N$ values there is permitted a reduction in cost for the detector electronics while permitting enhanced electronic noise rejection. The tangential spot velocities for the holograms 34a–34e inclusive (FIG. 3) are between 534 feet/second and 555 feet/second. The diffracted light beams 58 will be focused at a point adjacent a target area represented by the plane 40 (FIGS. 1 and 2). Each of the holograms 34a–34e inclusive is constructed to have a different focal length, which results in each of the diffracted light beams 58 overlapping each other adjacent the plane 40 to produce an enhanced depth of focus formed by each of the scanning beams diffracted by the holograms 34a–34e inclusive.

Figure 9:
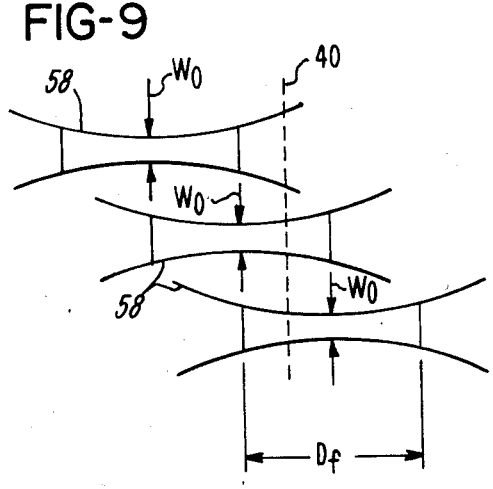
FIG. 9 is a schematic representation of the scanning beams of light from the holograms showing the location of the depth of focus portions of the beams.
Figure 11:
FIG. 11 illustrates a truncated UPC label.

As shown in FIG. 9, the diffracted light beam 58 projected by each of the holograms 34a–34e inclusive includes a portion $D_f$ characterized as a depth of focus in which the minimum spot size $W_o$ occurs at the center of the depth of focus portion. The holograms 34a–34e inclusive (FIG. 3) will project their light beams at the mirrors 36a–36c inclusive, which reflect the light beams toward the mirrors 38a–38c inclusive, which in turn direct the light beams towards the plane 40 (FIGS. 1 and 2) at which a UPC label 42 (FIGS. 1 and 10) or the like is located. As further shown in FIG. 9, this scanning action results in the depth of focus portions of each of the scanning beams 58 overlapping each other adjacent the plane 40 through which a bar code label passes. Providing each of the holograms 34a–34e inclusive with a different depth of focus enables the scanning system to scan a trunicated bar code label 43 (FIG. 11) which may be oriented on the article passing through the target area at an angle with the plane 40, thereby increasing the rate of success of the scanning operation. In the present example, the hologram 34a has a focal length of 21 inches. Each of the remaining holograms 34b–34e inclusive has a focal length which is greater than the preceding hologram by ½ inch.

Figure 5:
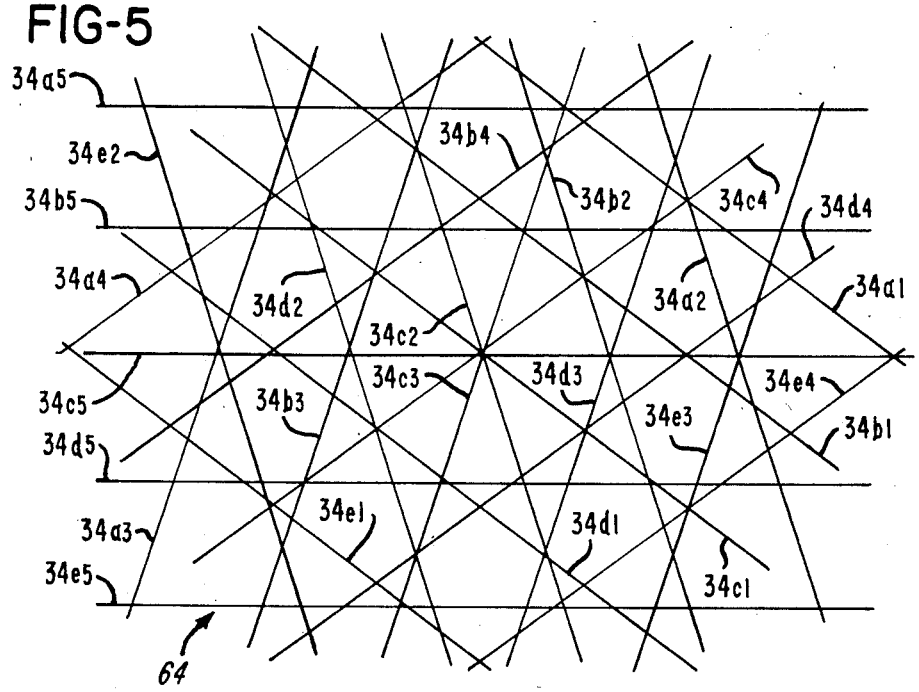
FIG. 5 is a illustration of the scan pattern generated by the scanning apparatus of FIGS. 3 and 4.

Referring now to FIG. 4, there is shown a front view of a mirror system which may be used to redirect the diffracted scanning beams at the target area generated by the holograms located on the rotating disk 30. As shown in FIG. 4, the diffracted scanning beams 58 (FIG. 2) will produce a scanning arc 62 against the mirrors 36a–36c inclusive which reflect the beams against the mirrors 38a–38c inclusive which in turn direct the beams towards the plane 40 (FIG. 1) thereby producing a cross-hatched scanning pattern generally indicated by the numeral 64 in FIG. 5. Each family of scan lines 34al–5 through 34el–5 inclusive shown in FIG. 5 is composed of scanning beams generated by the corresponding hologram 34a–34e inclusive (FIG. 3) directed at one of the mirrors 36a–36c inclusive and one of the mirrors 38a–38c inclusive. The following table illustrates the mirror sequence for generating the scan lines as numbered in FIG. 5 for each of the holograms 34a–34e inclusive as identified in FIG. 3 during one revolution of the disc 30.

TABLE

| Scan Lines | Mirror Sequence |
|---|---|
| 34a1–34e1 | 36c, 38a |
| 34a2–34e2 | 36a, 38a |
| 34a3–34e3 | 36b, 38c |
| 34a4–34e4 | 36c, 38c |
| 34a5–34e5 | 36c, 38b |

Utilizing the above table, scan line 34al (FIG. 5) will be produced by the light beam diffracted by hologram 34a (FIG. 3) and reflected by mirrors 36c and 38a (FIG. 4). In a similar manner, scan lines 34bl–34el inclusive are produced by holograms 34b–34e inclusive (FIG. 3) using the same two mirrors.

Figure 6:
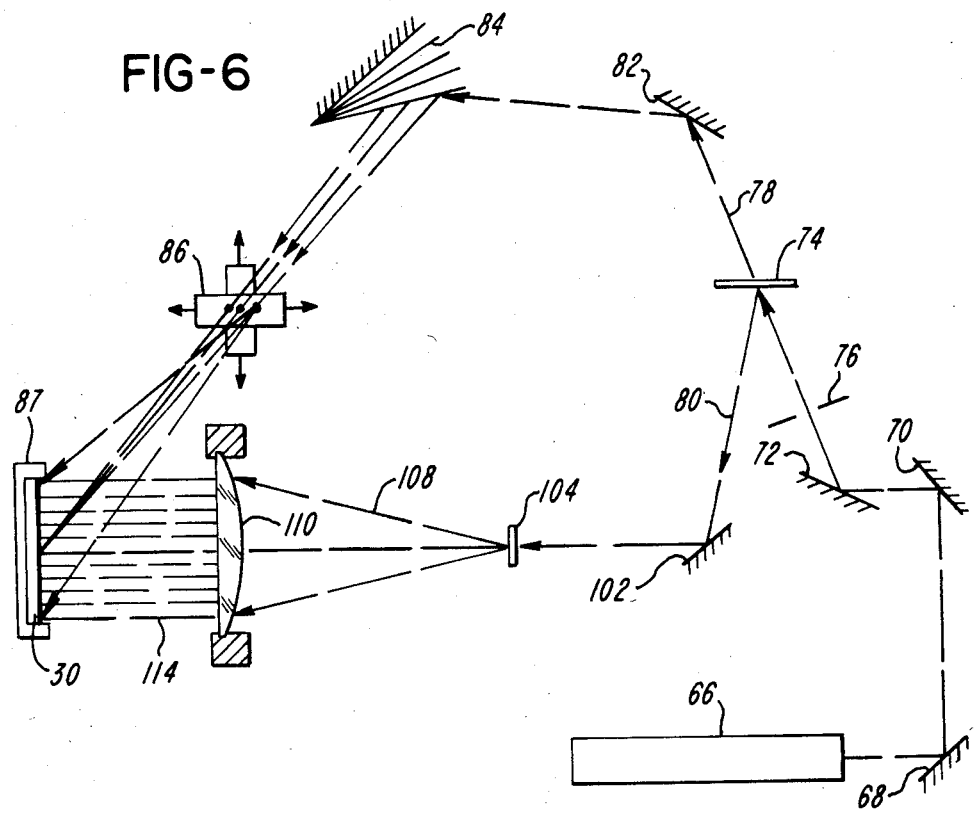
FIG. 6 is a top view of a schematic representation of the arrangement for constructing the holograms located on the rotating disk.

Referring now to FIG. 6, there is shown a schematic representation of a top view of the arrangement for constructing the rotating disk 30 of FIG. 1. The output beam of a 50–80 milliwatt helium-neon laser 66 is directed towards a mirror system comprising mirrors 68, 70 and 72 which deflect the light beam onto a variable beam splitter 74 through a shutter 76 with the beam splitter 74 splitting the beam into two segments 78 and 80. The beam segment 78 is reflected from a mirror 82 to a variable-position mirror 84 which is oriented in one of five positions as shown, wherein each position is associated with a fabrication of one of the holograms 34a–34e inclusive (FIG. 3). From the mirror 84 the light beam segment 78 is reflected through a spatial filter/microscopic objective assembly 86 which provides a translating off-axis point source with the corresponding position of the variable position mirror 84. The resulting diverging wave front functioning as the object beam will be centered on a rotating disk holder assembly 87 mounted for rotation and supporting the rotating disk 30 in a position for the fabrication of the holograms 34a–34e inclusive (FIG. 3).

Figure 7:
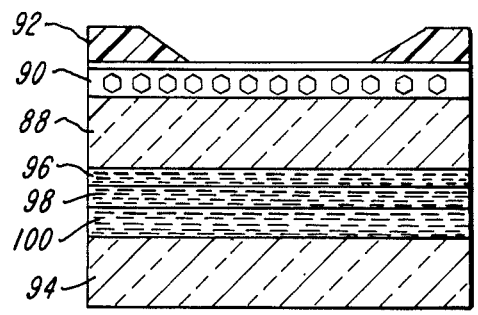
FIG. 7 is a cross-sectional view of the rotating disk showing details of the construction of the holograms of the present invention.

As best seen in FIG. 7, the rotating disk 30 at the time of fabricating the holograms 34a–34e inclusive comprises a glass substrate 88, the face of which is coated with a silver-halide emulsion 90 on which is positioned a movable wedge-shaped exposure mask 92 for exposing portions of the silver-halide emulsion to form the interference pattern which constitutes the holograms 34a–34e inclusive. Sandwiched between the glass substrate 88 and a second glass substrate 94 are layers of an anti-halation backing 96, a low viscosity index matching fluid 98, and processed silver grains 100.

Referring again to FIG. 6, it is seen that the light beam segment 80 projected by the splitter 74 will be reflected by a mirror 102 towards a microscopic objective/spatial filter assembly 104 which generates an expanding light beam 108. The light beam 108 is directed at a lens element 110 which projects a collimated light beam 114 towards the disk holder assembly 87 and the disk 30.

In the operation of the method disclosed in FIG. 6, the rotating disk 30, with a properly-dimensioned collection hologram exposure mask 92 (FIG. 7) located on the face of the disk 30, is mounted in the holder assembly 87. With the variable position mirror 84 and the spatial filter/microscopic objective assembly 86 adjusted to a first location, the shutter 76 is activated to expose a face of the disk 30 in which the mask 92 permits only one pie-shaped wedge area of the loaded silver-halide disk 30 to be exposed for each angular rotational position of the disk 30. The mask 92 is then covered completely and the holder assembly 87 is rotated to the next position for exposure of the second collection hologram. The variable position mirror 84 and the objective assembly 86 are readjusted to locate the focal point at a distance which differs from that of the other collection holograms.

At this time the mask 92 associated with the collection holograms 34a–34e inclusive is replaced with a mask for exposing the holograms 34a–34e inclusive to produce the scanning characteristics of the holograms 34a–34e inclusive. The sequence of adjusting the position of the variable position mirror 84 together with the objective assembly 86 and the holder assembly 87 is, in the manner described above, repeated, which allows the scanning characteristics of the holograms 34a–34e inclusive to be fabricated. The exposed rotating disk 30 may be processed in any conventional manner that is well-known in the art.

Figure 8:
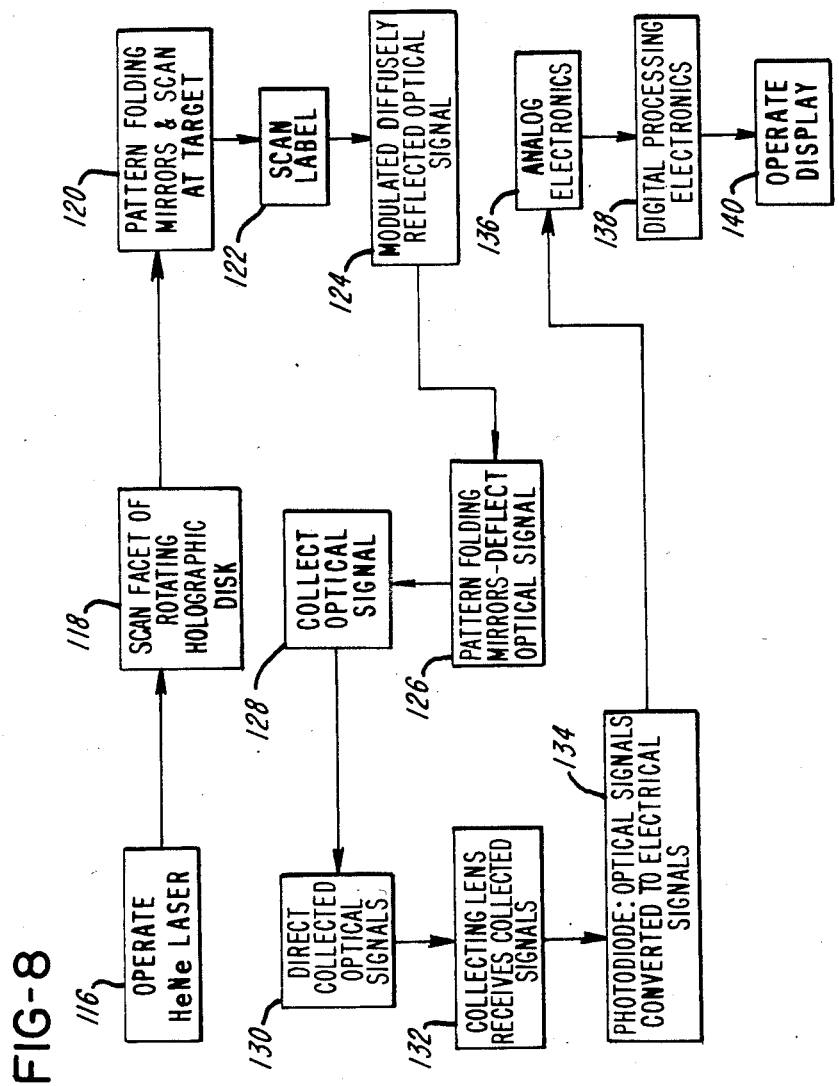
FIG. 8 is a block diagram of the system of the present invention for reading the UPC bar code.

Referring now to FIG. 8, there is shown in block form a flow chart of the operation of the scanning system disclosed in FIG. 1. Operation of the helium-neon laser 20 (block 116) results in the projection of a collimated scanning beam 22 impinging on the holograms 34a–34e inclusive (FIG. 3) on the rotating disk 30 (block 118), each of which reflects the scanning beam to the pattern focusing mirrors 36, 38 (FIG. 4) (block 120) which in turn direct the scanning beam to the target area where the beam will scan the bar coded label 42 (block 122) with the scan pattern 64 (FIG. 5) as determined by the arrangement of the mirrors 36a–36c inclusive and 38a–38c inclusive (FIG. 4). The scanning beam 22 is reflected from the label 42 as a modulated diffusely-reflected optical signal (block 124) which is reflected by the pattern folding mirrors 36a-36c and 38a-38c inclusive (block 126) towards the holograms 34a-34e inclusive on the rotating disk 30. The holograms 34a-34e inclusive will collect (block 128) the reflected light beams 44 (FIG. 1) and direct the collected light beams towards the mirrors 26 and 28 (FIG. 1) (block 130) which in turn reflect the collected optical signals to the collecting lens 46 (FIG. 1) (block 132). The lens 46 focuses the collected light beams at a point occupied by the photodiode 48 (block 134) which converts the received light beam into electrical signals, which signals are then processed (block 136) by an analog electronic system and decoded (block 138) by a digital processing system. If a valid read operation has occurred, a display on the terminal 54 (FIG. 1) is energized (block 140) indicating such a condition to the operator.

Although a preferred embodiment of the present invention has been described herein, it is not intended that the invention be restricted thereto, but that it be limited only by the true spirit and scope of the appended claims.

What is claimed is:

1. An apparatus for scanning an article comprising:
   a source of light beams;
   a rotating member positioned to receive said light beams;
   a plurality of hologram members located on said rotating member to intercept said light beams, each of said hologram members having one side constructed to have a different focal point for focusing said light beams at a scanning area through which an article passes which overlaps the focal point of each of the other hologram members and its other side constructed for collecting the light beams reflected from the article and focusing the reflected light beams at a collection area;
   means mounted adjacent the scanning area for directing the light beams reflected from the article to the hologram member which collimate and direct the reflected light beams to the collection area; and
   means positioned at the collection area for detecting changes in the intensity of the light beams reflected from the article.

2. The scanning apparatus of claim 1 in which said rotating member comprises a disk member mounted for rotation about its center, said hologram members forming equal surface areas of the total surface area of the disk member.

3. The scanning apparatus of claim 2 in which said directing means further includes a plurality of reflecting devices for reflecting the light beams received from the hologram members toward said scanning area as a series of intercepting diagonal and substantially horizontal lines relative to the path of the article passing through the scanning area during one revolution of the disk member.

4. The scanning apparatus of claim 3 in which the number of hologram members on the rotating disk member is five and the number of intercepting diagonal and horizontal lines is twenty-five.

5. The scanning apparatus of claim 4 in which each of the hologram members diffract said light beam at a first predetermined angle with respect to the line of travel of said light beams and in which the first predetermined angle varies by a second predetermined angle with each succeeding hologram member.

6. The scanning apparatus of claim 5 in which the second predetermined angle is one degree.

7. An apparatus for scanning a coded label comprising:
   a laser for projecting narrow beams of light along a first path;
   a first optical reflecting member positioned in said first path, said reflecting member having an aperture therein through which the beam of light travels along said first path;
   a second optical reflecting member positioned in said first path for reflecting the beams of light along a second path;
   a substrate of material mounted for rotation on its center in said second path;
   means for rotating said substrate;
   a plurality of two sided hologram members formed as facets around the substrate comprising the total surface area of the substrate to intercept said beams of light, each of said hologram members having one side constructed to focus said beams of light at a different focal point adjacent a scanning area which overlaps the focal point of each of the other hologram members for scanning a bar coded label on an article which passes through said scanning area, said hologram members having the other side constructed to receive light beams reflected from the coded label for collimating the reflected light beams at said first and second optical members which reflect the collimated light beam to a receiving area;
   a plurality of sets of mirrors positioned between the hologram members and the scanning area for reflecting the light beams received from the hologram members towards said scanning area as a series of intercepting diagonal and substantially horizontal lines relative to the path of the article passing through the scanning area during one revolution of the substrate and for directing the light beams reflected from the coded label to the hologram members;
   a lens member positioned at the receiving area for focusing the received collimated light beams at a collection point; and
   photodetector means positioned at said collecting point for detecting changes in the intensity of the light beams reflected from the coded label on the article passing through the scanning area.

8. The scanning apparatus of claim 7 in which the number of hologram members on the rotating substrate is five and the number of intercepting diagonal and horizontal lines is twenty-five.

9. The scanning apparatus of claim 8 in which each of the hologram members diffract said light beam at a first predetermined angle with respect to the line of travel of said light beams and in which the first predetermined angle varies by a second predetermined angle with each succeeding hologram member.

10. The scanning apparatus of claim 9 in which the second predetermined angle is one degree.

* * * * *